Aug. 16, 1949.  E. PORTER  2,479,134
WHEEL CONSTRUCTION FOR AMPHIBIOUS VEHICLES
Filed July 13, 1945
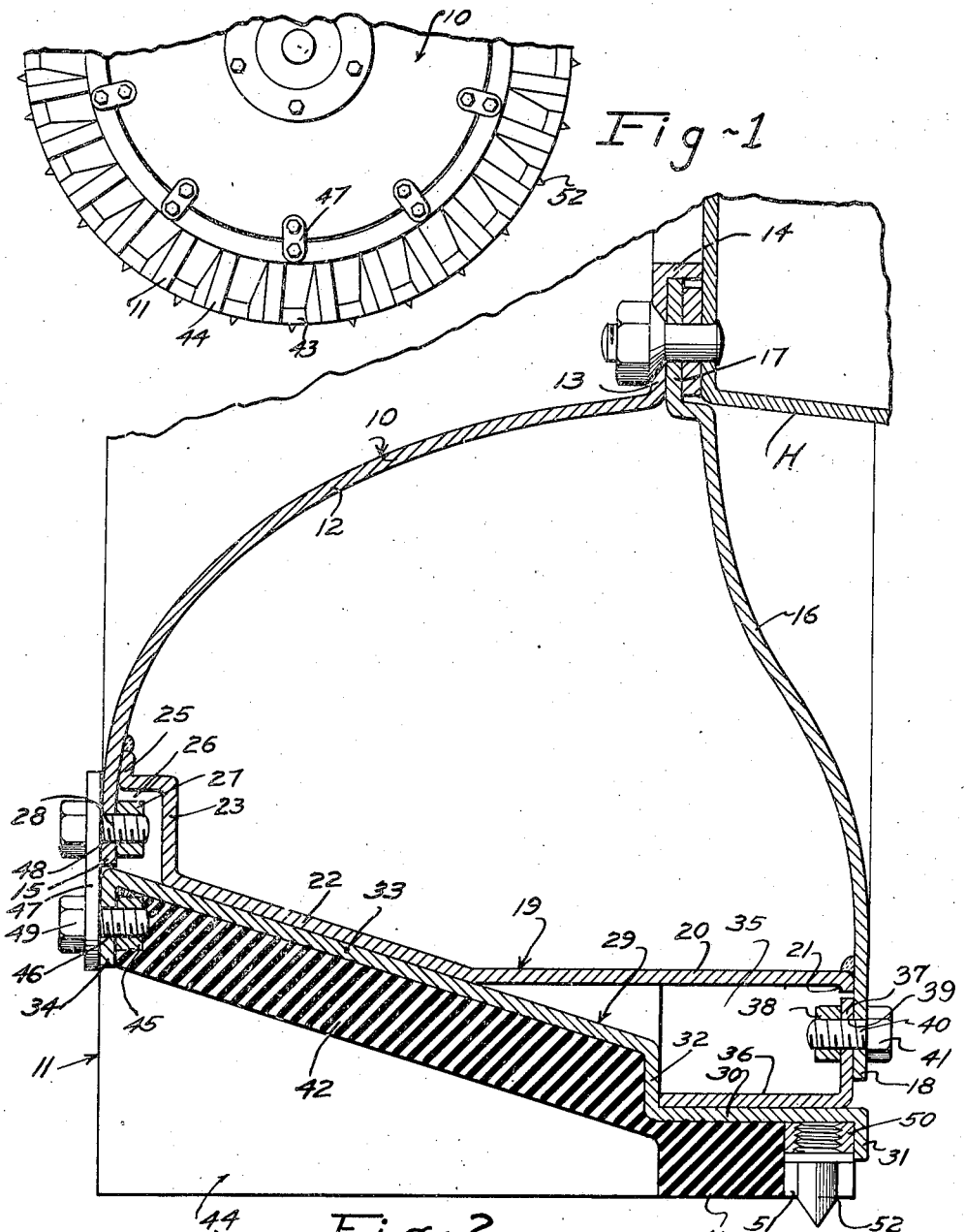
INVENTOR.
EDWARD PORTER
BY
Wilfred E. Lawson
ATTORNEY Patented Aug. 16, 1949

2,479,134

UNITED STATES PATENT OFFICE 2,479,134

WHEEL CONSTRUCTION FOR AMPHIBIOUS VEHICLES

Edward Porter, Akron, Ohio, assignor of one-fiftieth to Ed. Ballash, Akron, Ohio, one-twentieth to F. M. Allen, Houston, Tex., and one-fiftieth to Ida Yoder, Wadsworth, Ohio Application July 13, 1945, Serial No. 604,798

6 Claims. (Cl. 115—1)

This invention relates to improvements in wheels for amphibious vehicles and pertains particularly to a wheel of novel design capable of functioning as a buoyant body in addition to its function as a propelling means for the vehicle both upon land and water.

A particular object of the present invention in addition to the object of providing a buoyant amphibious vehicle wheel capable of furnishing a maximum of propelling effort over all types of terrain as well as in the water, is to provide a wheel structure wherein a cleated tread unit is demountably secured to the wheel body in such a manner that it may be applied or removed easily and quickly and will guide itself into mounting position when being applied due to the tapered or inclined formation of co-acting parts between the said unit and the body of the wheel.

Another important object of the invention is to provide a wheel structure which is so designed as to furnish maximum traction effort over soft terrain as, for example, in mud, snow or sand as well as over hard earth, ice or any other type of hard surface.

Another object of the invention is to provide a wheel construction wherein the wheel body portion is in the form of an annular, air and water tight cell, around which the tread unit is positioned and to which such unit is secured, with means for coupling the body and tread units together in a novel manner whereby portions of the coupling elements are housed and effectively protected against damage and loss.

Other objects and advantages of the invention will become apparent as the description of the same proceeds and the invention will be best understood from a consideration of the following detailed description taken in connection with the accompanying drawing forming part of the specification, with the understanding, however, that the invention is not confined to a strict conformity with the showing of the drawing but may be changed or modified so long as such changes or modifications mark no material departure from the salient features of the invention as expressed in the appended claims.

In the drawing:

Figure 1 is a view in elevation of a portion of a wheel constructed in accordance with the present invention.

Figure 2 is a sectional view on an enlarged scale through the rim and tread portion of the wheel.

Figure 3 is a fragmentary view looking at the tread.

Referring now more particularly to the drawing wherein like numerals of reference designate corresponding parts throughout the several views, the numeral 10 generally designates what will be referred to as the body portion of the wheel, which portion is secured to the rotatable, axle carried, brake enclosing housing, shown in broken outline and designated H.

The other portion or unit of the wheel structure may be referred to as the tread unit and is generally designated 11.

The body portion of the wheel which is in the form of an annular air and water tight cell, comprises an outer wall 12 which is arcuate in cross section as shown and merges at its inner edge with the flat hub plate portion 13 which in turn is integral with a right angularly extending inwardly, axially directed hub flange 14. The outer edge of the wall 12 is designated 15 and is directed radially away from the axial center of the wheel. Thus the wall 12, being of substantially constant thickness and arcuate in cross section, has its convex side or surface outwardly.

Cooperating with the outer wall 12 is the inner wall 16 which is of annular form and encircles the hub flange 14, lying against and being welded to the inner side of the plate 13. From this portion 17 which lies against the plate portion 13 of the outer wall, the inner wall extends outwardly and has, in cross section, an elongated ogee configuration, being substantially straight at its outer or peripheral portion where the edge 18 is radially directed and substantially parallel with the portion immediately adjacent to the edge 15 of the wall 12. However, the inner wall 16 is of greater radial extent from its inner to its outer edge so that the outer radial edge 18 extends farther outwardly from the axial center of the wheel than does the edge 15 of the outer wall.

Disposed between and connecting the inner and outer walls is the intermediate wall which is generally designated 19. This intermediate wall has an inner horizontal portion 20 which is substantially parallel to the rotary axis of the wheel, the inner edge of which is turned outwardly as indicated at 21 and is welded to the inner side of the straight outer portion of the inner wall 16, at a line set inwardly from the free radially directed outer edge 18 of the inner wall as shown.

The straight portion 20 of the intermediate wall extends approximately half way across the space between the inner and outer walls and is then directed inwardly toward the axial center of the wheel at a flat angle through the portion 22, to within a short distance from the free outer edge 15 where it joins the radially inwardly directed portion 23 which substantially parallels the inner face of the outer wall 12, and then it continues axially outwardly through the portion 24 and terminates in the flange 25 which is welded to the inner surface of the wall 12 as shown. There is thus provided between the portions 23 and 24 of the intermediate wall structure, and a part of the outer wall 12 adjacent to the free outer edge, an annular channel or recess 26. Within this channel there are secured to the inner side of the wall 12 the nuts 27 which aline with bolt openings 28 formed through the wall 12 for the insertion of bolts from the outside.

From the foregoing it will be seen that the wheel body portion 10 is made up of the three wall sections which are welded together throughout their meeting surfaces so that the body forms an air and water tight cell of annular form which is of gradually increasing width from the central part to the outer part where the thread unit 11 is applied.

The tread unit 11 comprises a base or backing plate 29 which is, of course, in the form of a ring or annulus. This plate 29 is of a width equal to the width of the body portion at its widest part and it comprises the relatively narrow inner portion 30 which along its inner edge is bordered by the radial outwardly extending flange 31, the short radial intermediate portion 32 which extends inwardly toward the axial center of the wheel, the relatively long angularly disposed portion 33 and the outer, radially outwardly directed terminal flange 34. As shown the narrow portion 30 of the base plate parallels the rotary axis of the wheel and the angularly directed portion 33 has the same angular disposition with respect to the rotary axis of the wheel and to the ground surface on which the tread bears, as the portion 22 of the intermediate wall plate 19, against the outer side of which it bears. This angular portion 33 is, however, of greater extent than the angular portion 22 of the intermediate wall plate so that it extends, at its inner part adjacent to the radially directed portion 32, beyond the outer side of the part 20 of the intermediate wall plate and this part together with the part 30, the part 20 of the intermediate plate and the part of the inner wall lying outwardly of the flange 21, forms an encircling chamber 35.

The radial outwardly directed flange 34 of the base plate is alined with the edge 15 of the outer wall so that the outer surfaces of these two parts are in a plane perpendicular to the rotary axis of the wheel. Also the inner flange 31 of the base plate is alined radially of the wheel with the free edge portion 18 of the inner wall.

Fixed to the inner side of the portion 30 of the base plate, is the band 36 which, at its outer edge, is turned to provide the flange 37. This flange is set inwardly from the flange 31, a distance substantially equal to the thickness of the wall 16 so that the flange 37 bears against the inner side of the wall 16 and opposes and surrounds the flange 21 of the intermediate wall plate 19.

Welded or otherwise fixed to the inner side of the flange 37 which forms an integral part of the tread unit, are the nuts 38 which aline with apertures 39 in the flange 37 and these apertures, when the tread unit is in position on the wheel body, aline with corresponding apertures 40 to receive the threaded shank portion of a bolt 41.

Overlying the outer side of the tread unit base plate and confined between the inner and outer flanges 31 and 34 respectively is the rubber tread which is generally designated 42. The portion of this rubber tread overlying the straight part 30 of the base plate is in the form of a band 43 which constitutes a tire band, while that portion of the rubber tread overlying the inclined part 33 of the base plate is formed to provide traction cleats 44 which, preferably, extend obliquely across the tread face. The ground contacting edges of the cleats 44 are straight and are in the same plane as the ground contacting surface of the band portion 43 but it will be seen that the cleats are of gradually increasing height from the inner ends to the outer ends so that snow or mud which may gather between them will be forced laterally outwardly and thus the cleats will be self-cleaning and will at all times be capable of maintaining the desired maximum traction effort.

Welded to the inner side of the outer flange 34 of the tread unit base plate, is a series of nuts 45 corresponding in number with the nuts 27 and each alining with a bolt opening 46. These nuts will be imbedded in the rubber tread material.

When the tread unit is applied to the wheel it will be seen that it may be slipped directly over the wheel body 10 and the inclined or angled portions 22 and 33 of the wall plate and base plate respectively will fit together so as to guide the tread unit directly into its proper position to bring the flange 37 against the outer face of the inner wall 16. The bolts 41 may then be readily applied to secure the parts together at the inner side of the wheel.

The body and tread units are coupled together at the outer side of the wheel by the employment of the short straight coupling plates or bars 47, each of which has a pair of apertures 48 therethrough which are spaced apart the same distance as two adjacent apertures 28 and 46 with which they are designed to aline. The bolts 49 are then inserted through the proper apertures for engagement with the nuts 27 and 45 whereby to tightly clamp together the outer sides of the body and tread units of the wheel structure.

At the inner side of the tire band 43 there are secured within the rubber tread material and against and to the straight portion 30 of the base plate, a plurality of calk nuts 50 and the material of the tire band is provided with suitable spaces 51 over these nuts to facilitate threading into these nuts the threaded inner end portions of the calks 52.

From the foregoing it will be readily apparent that there is provided in the present wheel structure a light but strong and durable and highly efficient traction gaining means which, at the same time, will function because of its novel construction, as a buoyant body when used upon an amphibious vehicle where the cleats 44 function in the nature of paddles.

While reference has been made to the use of the wheel on an amphibian vehicle it is to be understood that the invention is not to be confined to such use. It is, obviously, of particular value when used upon an amphibian vehicle but it will be readily apparent that it may be used also upon other types of vehicles and, therefore, it shall be understood that the invention contemplates the use of the wheel upon all types of land vehicles such as those used on farms or for other types of work. It will be readily apparent that even though the vehicle upon which the wheels of the present invention are employed, might be exclusively land vehicles, the buoyant character of the wheels will be of particular advantage where the vehicle may be run over soft, boggy or marshy ground.

What is claimed is:

1. An amphibious vehicle wheel, comprising a buoyant annular air and water tight cell adapted to be secured to a vehicle axle, said cell having a radial tread wall having a face which is at an angle to the rotary axis of the wheel, and a tread unit encircling and secured to the said tread wall face of the cell and having radial cleats each having a traction surface engaging edge paralleling said axis.

2. An amphibious vehicle wheel, comprising two circular, concentric, annular plates joined together at their inner edges and extending in divergent relation outwardly from the joined edges, means for securing the plates at said edges to a vehicle axle, the plate at the inner side of the wheel being of materially greater overall diameter than the other plate, an intermediate wall plate connecting the two plates together adjacent to their outer edges and having the radial outer face at an angle to the rotary axis of the wheel, the several plates being joined in air and water tight relation to form a buoyant body, a tread unit encircling the intermediate plate, and means securing the tread unit to said circular plates.

3. An amphibious vehicle wheel, comprising two circular, concentric, annular plates joined together at their inner edges and extending in divergent relation outwardly from the joined edges, means for securing the plates at said edges to a vehicle axle, an intermediate wall plate connecting the two plates together adjacent to their outer edges, the said two plates being of different diameters whereby the one upon the inner side of the wheel is of greater radial extent than the one upon the outer side, the said intermediate wall plate extending through a portion of its width at an angle to the rotary axis of the wheel to meet the outer side plate, a tread unit encircling the intermediate wall plate and having a portion disposed at the same angle and abutting against the angled portion of said intermediate wall plate, and said tread unit including a tread formed through the axial extent of the angled portion of the unit to provide traction cleats having a greater height at their outer than at their inner ends.

4. An amphibious vehicle wheel as set forth in claim 3, wherein the portion of the said tread lying between the inner ends of the cleats and the plane of the radial outer edge of the inner side plate, is in the form of a band functioning as a tire, and the ground contacting surface of the tire band and the ground contacting edges of the cleats being in a common plane.

5. An amphibious vehicle wheel, comprising two circular, concentric, annular plates joined together at their inner edges and extending in divergent relation outwardly from the joined edges, means for securing the plates at said joined edges to a vehicle axle, an intermediate wall plate connecting the two plates together adjacent to their outer edges, the said two plates being of different diameters whereby the one upon the inner side of the wheel is of greater radial extent than the one upon the outer side, the said intermediate wall plate extending through a portion of its width at an angle to the rotary axis of the wheel to meet the outer side plate, the edges of the intermediate wall plate being spaced inwardly from the radial edges of said concentric plates, a tread unit encircling the intermediate wall plate and including an inwardly directed flange portion positioned against the outer side of the inner one of the annular plates, a series of coupling links disposed across the radial outer edge at the outer side of the outer one of the two concentric plates and across the adjacent edge of the tread unit, bolts securing said links at their two ends to the tread unit and to the said outer one of the concentric plates, bolts securing said tread unit flange to the said inner one of the annular plates, and said tread unit further including a tread body having cleats disposed transversely of the unit and of a greater height at their outer than at their inner ends.

6. An amphibious vehicle wheel as set forth in claim 3, wherein the portion of the said tread lying between the inner ends of the cleats and the plane of the radial outer edge of the inner side plate, is in the form of a band functioning as a tire, the ground contacting surface of the tire band and the ground contacting edges of the cleats being in a common plane, and a plurality of calks carried by the tread unit in the portion thereof defined by said tire and projecting radially of the wheel beyond the said common plane of the tire band and cleats.

EDWARD PORTER.

REFERENCES CITED

The following references are of record in the file of this patent:

UNITED STATES PATENTS

| Number | Name | Date |
|---|---|---|
| 499,514 | Buchanan | June 13, 1893 |
| 1,110,156 | Stewart | Sept. 8, 1914 |
| 1,610,731 | Barth | Dec. 14, 1926 |